April 8, 1958     D. P. GAETA     2,829,469
FLORIST'S PICK
Filed March 14, 1955
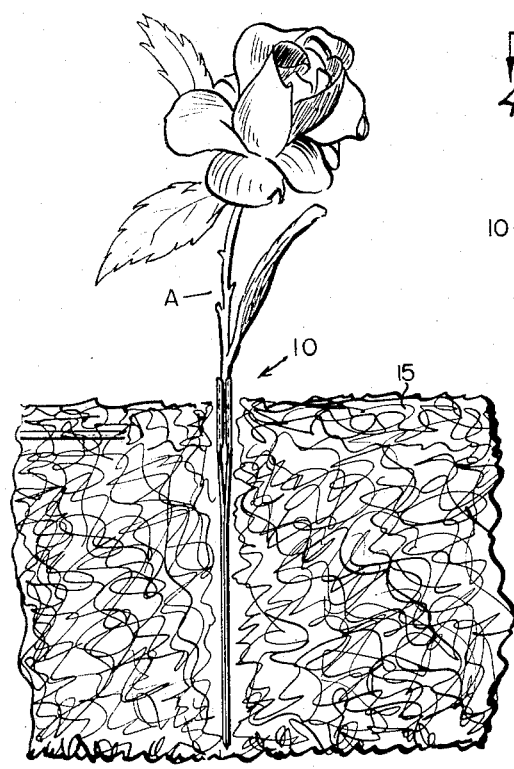
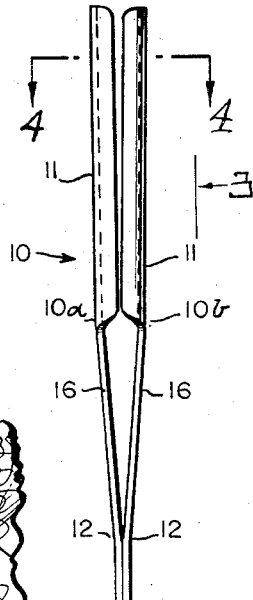
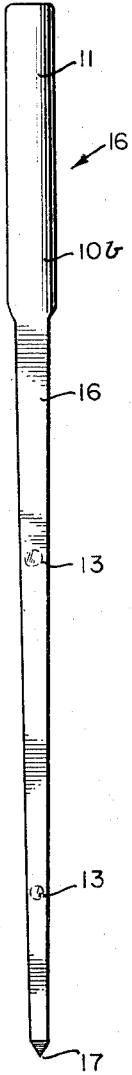
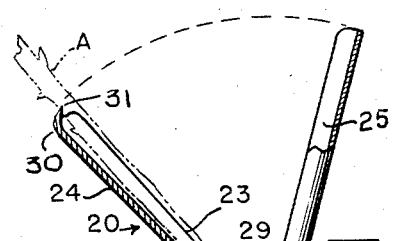
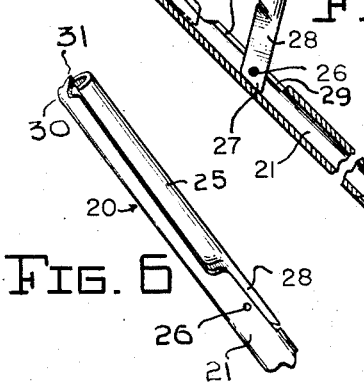
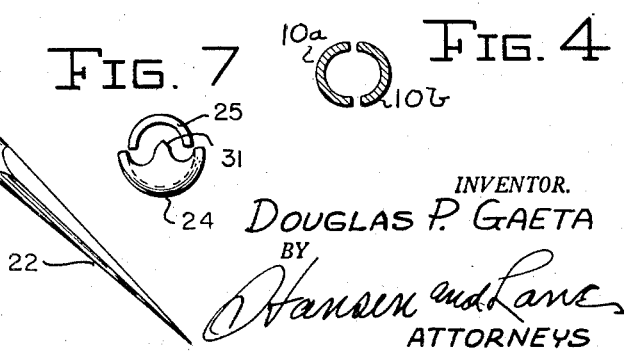
INVENTOR.
DOUGLAS P. GAETA
BY
Hansen and Lane
ATTORNEYS

United States Patent Office 2,829,469
Patented Apr. 8, 1958

2,829,469

FLORIST'S PICK

Douglas P. Gaeta, San Jose, Calif., assignor to Floral-Aid of San Jose, Inc., a corporation of California Application March 14, 1955, Serial No. 494,210

1 Claim. (Cl. 47—55)

This invention relates to florist's picks and pertains more particularly to a pick for threading the stems of flowers into and through a backing for a floral set piece, and then releasing them in such position.

An object of the present invention is to provide an improved florist's pick which may be readily attached to the stems of various flowers, and which is capable of carrying the stems of the flowers into the backing member of a floral set piece, and of then being easily released from the stem.

Another object of the invention is to provide a florist's pick of the character described having a pair of clamp-like holding jaws of greater thickness than a penetrating spike portion thereof, whereby the jaws enclose the stem of a flower therebetween thereby to carry the stem of a flower inserted therein into the body of a floral set piece, and are pressed by the set piece into stem gripping position.

Still another object is to provide a florist's pick which is easily and cheaply manufactured, and which may be used to thread flower stems into the body of a floral set piece, and then released therefrom.

These and other objects and advantages of the invention will be apparent from the following description and the accompanying drawings, wherein:

Fig. 1 is a side elevational view of a florist's pick embodying the invention, the pick being shown in the act of drawing the stem of a flower into a fragment of the body of a set piece.

Fig. 2 is an enlarged side elevational view of the pick shown in Fig. 1.

Fig. 3 is a similarly enlarged side elevational view taken in the direction of the arrows 3—3 of Fig. 2.

Fig. 4 is a further enlarged sectional view taken along the line 4—4 of Fig. 2.

Fig. 5 is a side elevational view, partly in section, of an alternate form of the invention, a pivoted, stem-clamping jaw being shown in open position, and a flower stem being shown in broken lines ready for clamping in the jaws of the pick, an intermediate portion of the pick being broken away.

Fig. 6 is a perspective view of the jaw end portion only of the pick shown in Fig. 5, but with the jaws in closed position.

Fig. 7 is an enlarged end view of the pick shown in Figs. 5 and 6.

A preferred form of the invention, shown in Figs. 1 to 4 inclusive, is embodied in a floral pick 10 consisting of two identical, but oppositely facing, sheet metal body portions 10a and 10b, preferably of light gauge springy metal such as spring steel. Each of the body portions 10a and 10b consists of a channel-like, stem-holding jaw portion 11 formed on its upper end, and a flat, elongated tine portion 12 extending endwise therefrom. The flat tine portions 12 are secured together throughout a major portion of their lengths as by a plurality of spot-welds 13 (Fig. 3). The remainder of the tine portions 12 are not secured together, but are free to separate, and thus provide resilient arm portions 16 which support the flower stem holding jaws 11 and urge them together to enclose a flower stem A inserted therebetween. The other, or tip end of the tine portions 12 is formed with a sharp point 17.

Since, as will be observed particularly in Figs. 1 and 2, the jaw portions 11 are substantially thicker than the tine portions 12 in the direction of jaw opening, when the jaws are drawn into the smaller opening made by the tine portion in penetrating the backing member 15, pressure will be exerted by the backing member on the jaws, tending to force them together into tighter, stem-gripping relation. When the pick is drawn through the backing member, the jaws will be freed from this lateral pressure, and may then be spread apart to release the stem.

A modified form of the invention is illustrated in Figs. 5 to 7 inclusive, wherein a florist's pick 20 comprises a tubular main body portion 21, the tip of which is formed into a pointed end 22 of triangular cross sectional shape.

At the other or jaw end of the tubular body portion 21, the tube is cut away along the line 23 to leave a fixed, channel-like semi-tubular jaw portion 24. The jaw portion 24 is adapted to cooperate with a jaw portion 25 pivotally mounted on a pin 26 to clamp a flower stem A therebetween.

The pivoted jaw portion 25 consists of a length of channel of semi-circular cross sectional shape having an end portion thereof compressed flatly to provide a mounting blade portion 28 which is inserted in a slot 29 provided therefor at one side of the body portion 21, said slot 29 communicating with the cut out portion 23 of the tubular body portion 21.

The blade portion 28 is mounted to frictionally engage the sides of the slot 29, so that when the pivoted jaw 25 is brought to its closed position shown in Figs. 6 and 7 to grip a flower stem between the jaws 24 and 25, sufficient frictional restraint will be provided so that the stem will not be readily released.

In order to further increase the stem-gripping ability of the jaws 24 and 25, the outer end 30 of the jaw 24 may be provided with an inwardly directed spur 31, which embeds itself in the side of the flower stem when the jaws 24 and 25 are closed.

While I have illustrated and described a preferred embodiment of my invention, as well as one modification thereof, it will be understood however that other changes and modifications may be made in the details thereof without departing from the scope of the invention as set forth in the appended claims.

Having thus described the invention, what I claim as new and desire to protect by Letters Patent is defined in the following claim.

I claim:

A florist's pick for threading the stems of flowers through the backing member of a floral set piece comprising a pair of identical but reversely mounted members, each comprising a thin, flat, elongated spike element of springy material, pointed at one end thereof, said spike elements being secured together in superposed, abutting relation to form a rigid spike portion of a length to penetrate such backing member, a jaw supporting continuation on each of said spike elements extending divergently, and at a slight, acute angle, from the opposite ends of said spike elements, and a flower stem receiving jaw portion formed integrally on the outer end of each jaw supporting continuation and co-extensive therewith, the jaw supporting continuations and jaws being normally sprung apart and separated from each other, and of smooth, continuous external conformation with the spike elements, each jaw being curved about an axis extending longitudinally thereof, and with the concave jaw sides facing inwardly, whereby the pick can easily penetrate and pass through a floral backing member, pressing the normally separated jaws together to grip the stem of a flower inserted therebetween for drawing such stem through the backing member.

References Cited in the file of this patent

UNITED STATES PATENTS

| | | |
|---|---|---|
| 501,134 | Francis | July 11, 1893 |
| 1,370,122 | Knowles | Mar. 1, 1921 |
| 1,845,154 | Jewett | Feb. 16, 1932 |
| 2,413,307 | Gifford | Dec. 31, 1946 |

FOREIGN PATENTS

| | | |
|---|---|---|
| 18,701 | Great Britain | Sept. 1, 1898 |